United States Patent [19]

Chang et al.

[11] Patent Number: 4,513,906

[45] Date of Patent: Apr. 30, 1985

[54] LIQUID TANK WELD CAVITATION PROTECTION

[76] Inventors: Yi M. Chang, 23146 Califa St., Woodland Hills, Calif. 91367; James R. Fenwick, 10553 Limerick, Chatsworth, Calif. 91311

[21] Appl. No.: 543,592

[22] Filed: Oct. 19, 1983

[51] Int. Cl.³ .............................................. B23K 31/00
[52] U.S. Cl. ....................................... 228/184; 29/463
[58] Field of Search .................. 228/184; 29/458, 463, 29/469.5; 220/85 M, 461; 138/30

[56] References Cited

U.S. PATENT DOCUMENTS

| | | | |
|---|---|---|---|
| 549,220 | 11/1895 | Townsend et al. | |
| 1,223,777 | 4/1917 | Eby. | |
| 1,693,695 | 12/1928 | Ellis. | |
| 1,859,632 | 5/1932 | Pheteplace. | |
| 1,921,642 | 8/1933 | Stephenson | 29/458 |
| 2,237,535 | 4/1941 | Wahl | 113/120 |
| 2,317,734 | 4/1943 | Cook | 29/458 |
| 2,369,381 | 2/1945 | Unke | 29/463 |
| 2,412,271 | 12/1946 | Kercher | 29/458 |
| 2,503,339 | 4/1950 | Jandus | 220/461 |
| 3,233,411 | 2/1966 | Schubert | 220/85 B |
| 3,779,420 | 12/1973 | Knaus | 220/63 R |
| 3,862,208 | 1/1975 | Waxlax | 138/30 |
| 4,304,038 | 12/1981 | Yabu et al. | 29/458 |

FOREIGN PATENT DOCUMENTS

| | | |
|---|---|---|
| 1170314 | 3/1962 | Fed. Rep. of Germany. |
| 740772 | 11/1955 | United Kingdom. |
| 948675 | 2/1964 | United Kingdom .............. 220/85 B |

*Primary Examiner*—Nicholas P. Godici
*Assistant Examiner*—M. Jordan

[57] ABSTRACT

Methods of protecting an edge weld of a thin metal bladder, which is positioned within a rigid walled tank, against a cavitation-induced collapse where the configuration of the interior surface of the bladder at the edge weld is in the structural form of a cavity which is horn-like in shape. One of the inventive devices is a backing made of hard and ductile material (such as an epoxy, or a brazing compound, or the like) which is interposed between and is in contact with the exterior surface of the bladder and the interior surface of the rigid walled tank in which the bladder is positioned, at a location adjacent to the edge weld of the bladder. Another of the inventive devices is a T-shaped ring disposed internal of the bladder, with the normally vertical leg of the T-shaped ring inserted into the horn-like cavity, and with the normally horizontal leg of the T-shaped ring positioned across the cavity and in contact with the interior surface of the bladder at a location adjacent to the cavity. The T-shaped ring can, but need not be, welded to and integrated with the edge weld; and, if the T-shaped ring is not welded to the edgeweld, a soft material (such as metallic wool, or open cell sponge, or closed cell foam, or the like) can, but need not be, disposed in the horn-like shaped cavity between the legs of the T-shaped ring. Still another of the inventive devices is a hard material (such as a brazing compound or the like) which is fixedly positioned in the horn-like shaped cavity, thereby filling the cavity. Yet another of the inventive devices is a portion of the bladder having a void at the innermost terminus of the edge weld, and also having a passageway which interconnects the void and the liquid in the bladder.

12 Claims, 7 Drawing Figures

4,513,906

LIQUID TANK WELD CAVITATION PROTECTION

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the prevention of cavitation-caused collapse of a partially liquid filled metal bladder tank, and more particularly to a variety of devices for, and methods of, protecting an edge weld of a thin metal bladder of a metal bladder tank against a cavitation-induced collapse, where the bladder is partially filled with a pressurized liquid in motion (i.e., in movement, such as acceleration), and where the bladder is positioned within a rigid walled (pressure) tank, and also where the configuration of the interior surface of the bladder at the edge weld is in the structural form of a cavity which is horn-like in shape.

As may not be known by those not of the art, a metal bladder tank comprises a thin metal bladder positioned within a rigid walled pressure vessel (hereinafter referred to as a "rigid walled tank" to distinguish it from the combination metal bladder tank). Typically, the thin metal bladder is edge welded on an external diameter. The external geometry of the bladder at the edge weld is, hydrodynamically, a horn and structurally quite stiff.

If the thin metal bladder of a metal bladder tank which is filled to a height, h, with liquid is sinusoidally shaken at an acceleration level $\pm G$ at a frequency f (Hz), a vapor film with a surge pressure $P_S$ is generated near the interior wall of the thin metal bladder if:

$$h\rho G > P_u - P_v$$

where:
 h = Liquid Height
 $\rho$ = Fluid density
 G = Acceleration Level
 $P_u$ = Ullage Pressure
 $P_v$ = Vapor Pressure
and where:

$$P_S = (a\rho/\pi)(G/F)$$

and also where, in addition to the above:
 a = Fluid Acoustic Velocity
 f = Frequency (Hz).

If the wall of the thin metal bladder, of the metal bladder tank, is flat and compliant, the surge pressure is reduced. However, if the wall of the thin metal bladder is convergent (like a cone and stiff horn), the impact energy is concentrated to a tiny region near the apex of the horn-shaped cavity. Surge pressures at this local point are many orders of magnitude larger than across the flat wall, and a cavitation-induced collapse of the thin metal bladder occurs at the apex of the horn-shaped cavity.

It is readily apparent, therefore, that what is needed in the art and is not presently available is a device for and/or a method of protecting an edge weld of a thin metal bladder of a metal bladder tank against a cavitation-inc-ced collapse in the above-mentioned circumstances.

SUMMARY OF THE INVENTION

The instant invention satisfies the hereinabove described need in the art. It, therefore, constitutes a significant advance in the state-of-the-art.

According to the instant invention, the cavitation-induced collapse (i.e., failure) of the edge weld which is external of the thin metal bladder is prevented by, in essence, either reinforcing the edge weld or eliminating (or, at least, minimizing) the horn-like shaped cavity which is internal of the thin metal bladder at a location adjacent the edge weld.

Therefore, it is an object of the instant invention to provide a suitable edge weld reinforment device, in the nature of a backing, to reinforce the exterior surface of the thin metal bladder at the edge weld location.

It is another object of this invention to provide a device, for eliminating (or, at least, minimizing) the horn-like shaped cavity, in the structural form of a T-shaped ring which is positioned internal of the thin metal bladder and which either can be integrated with the edge weld at the apex of the horn-like shaped cavity, or which can be removably inserted into the cavity.

It is still another object of the insta-t invention to provide a cavity elimination device which includes, in combination, a T-shaped ring and soft material disposed within the horn-like shaped cavity, with one leg of the T-shaped ring positioned within the cavity and with the soft material disposed between the legs of the T-shaped ring.

It is a yet another object of this invention to provide a suitable edge weld reinforcement device, in the structural form of a cavity eliminator, which comprises hard material placed in the horn-like shaped cavity.

It is a further object of the instant invention to provide a device, for protecting the edge weld, which is in the structural form of a void at the innermost terminus of the edge weld, and a passageway that is in communicarion with the void and with the liquid in the thin metal bladder.

It is a still further object of this invention to provide a plurality of methods which set forth the unique and fundamental steps which are to be performed to attain the structure of each of the above-mentioned edge weld cavitation collapse prevention devices, respectively.

These objects of the instant invention, as well as other objects related thereto, will become readily apparent after a consideration of the description of the invention, together with reference to the contents of the Figures of the drawing.

Figure 1:
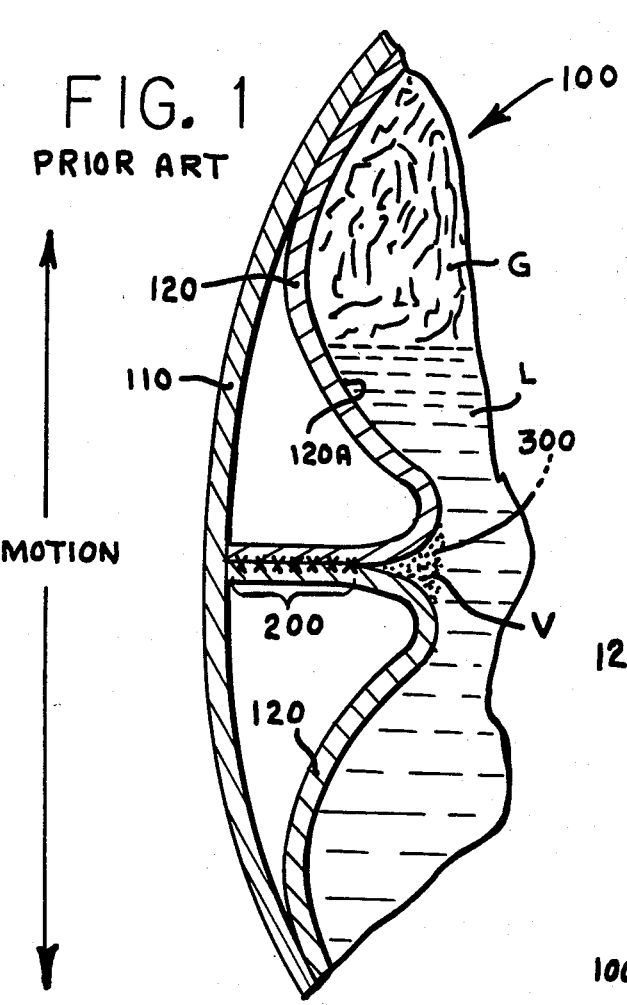
FIG. 1 is a side elevational view, in simplified schematic and pictorial form, partially fragmented and in cross section, of a representative (i.e., typical) partially liquid filled metal bladder tank in motion, showing the constituent thin metal bladder positioned within the constituent rigid walled tank (i.e., the external pressure vessel), with the thin metal bladder having the edge weld which is to be protected from cavitation-induced collapse, because of the stiff, horn-like shaped cavity internal of the bladder and adjacent to the edge well.

It is here to be noted that the contents of FIGS. 2-7, inclusive, of the drawing also show the results of practicing the steps of the method portions of the instant invention.

DESCRIPTION OF THE PREFERRED EMBODIMENTS

As a preliminary matter, and with reference to FIG. 1, it is to be noted and remembered that the instant invention is for use with a typical metal bladder tank 100 which comprises an outer rigid walled tank 110 and an inner thin metal bladder 120. As can be readily seen in FIG. 1, the thin metal bladder 120 is disposed within the rigid walled bank 110, and is partially filled with a liquid L, with a pressurized gas G being above the surface of liguid L. The thin metal bladder 120 has an edge weld 200, and the configuration of the interior surface 120 A of the bladder 120 at the edge weld 200 is in the structural form of a cavity 300 which is horn-like in shape. In this regard, and as previously has been stated herein the internal geometry (i.e., cavity 300) at the edge weld 200 is, hydrodynamically, a horn and quite stiff. As a related matter, and as previously stated herein, when the partially filled metal bladder tank 100 is in motion in commonly encountered situations, a vapor film V is generated near the inner wall 120A of the bladder 120 in the horn-like shaped cavity 300 adjacent to the edge weld 200. As a result, cavitation will, in due course, cause (i.e., induce) the collapse (i.e. rupture) of the edge weld with highly undesirable results.

Figure 2:
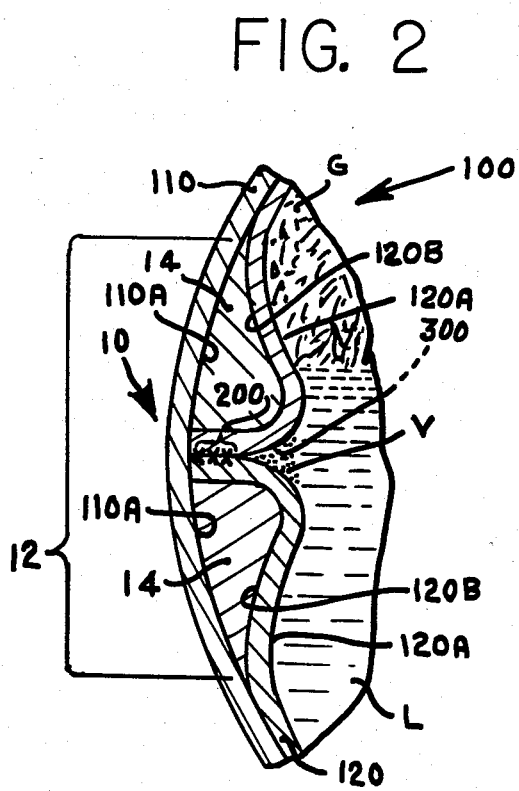
FIG. 2 is a side elevation view, in simplified schematic and pictorial form, and partially fragmented and in cross section, of the representative metal bladder tank shown in FIG. 1 in which has been incorporated a preferred embodiment of the instant invention.

Now, with reference to FIG. 2, therein is shown a preferred embodiment of the apparatus portion of the instant invention, i.e., a device 10 for protecting the edge weld 200 against a cavitation-induced collapse. This device 10 comprises a backing 12 of hard and ductile material 14 which is interposed between and is in contact with the exterior surface 120B of the metal bladder 120 and the interior surface 110A of the tank 110 at a location adjacent to the edge weld 200 of the bladder 120. The hard and ductile material 14 can be an epoxy, or a brazing compound, or the like.

Figure 3:
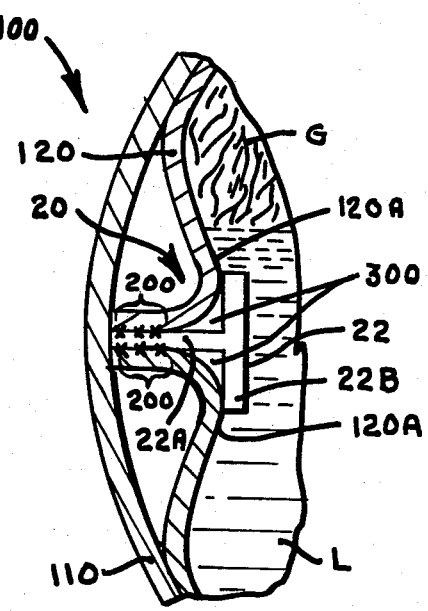
FIG. 3 is a side elevation view, in simplified schematic and pictorial form, partially fragmented and in cross section, of the representative metal bladder tank shown in FIG. 1 in which has been incorporated another preferred embodiment of the instant invention.

With reference to FIG. 3, therein is shown another preferred embodiment 20 of a device for protecting the edge weld 200 against a cavitation-induced collapse. This device 20 comprises a T-shaped ring 22 which is integrated with the edge weld 200, preferably by welding. More specifically, the T-shaped ring 22 of the device 20 is disposed internal of the bladder 110, with the normally vertical leg 22A of the T-shaped ring 22 inserted into the horn-like shaped cavity 300, and with the normally horizontal leg 22B (i.e., the cross leg) of the T-shaped ring 22 positioned across the cavity 300 and in contact with the interior surface 120A of the bladder 120 at a location adjacent to the cavity 300.

Figure 4:
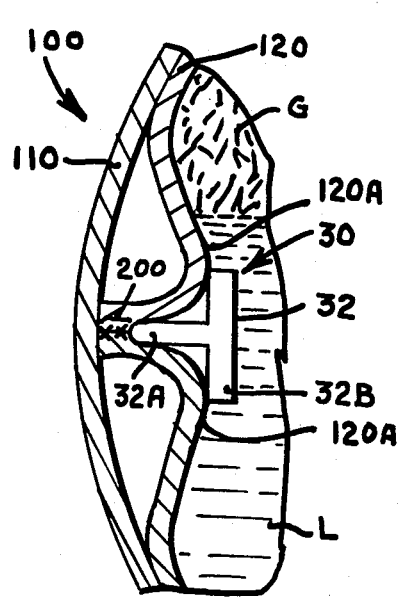
FIG. 4 is a side elevation view, in simplified schematic and pictorial form, partially fragmented and in cross section, of the representative metal bladder tank shown in FIG. 1, in which has been incorporated still another preferred embodiment of the instant invention.

Now, with reference to FIG. 4, there is shown still another preferred embodiment 30 of a device for protecting the edge weld 200 against a cavitation-induced collapse. This device 30 comprises a T-shaped ring 32 which is simply removably inserted into the horn-like shaped cavity 300, i.e., it is not welded or otherwise fixedly attached to the edge weld 200 and/or to the thin metal bladder 120. Similar to preferred embodiment 20, FIG. 3, the T-shaped ring 32 of this preferred embodiment 30, FIG. 4, is disposed internal of the bladder 120, with the normally vertical leg 32A of the T-shaped ring 32 inserted into the horn-like shaped cavity 300, and with the normally horizontal leg 32B (i.e., the cross leg) of the T-shaped ring 32 in contact with the interior surface 120A of the bladder 120 at a location adjacent to the cavity 300.

Figure 5:
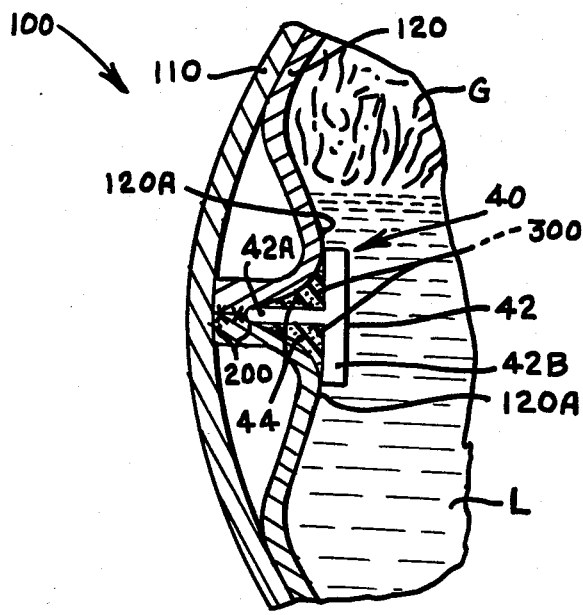
FIG. 5 is a side elevation view, in simplified schematic and pictorial form, partially fragmented and in cross section, of the representative metal bladder tank shown in FIG. 1, in which has been incorporated yet another preferred embodiment of the instant invention.

With reference to FIG. 5, therein is shown yet another preferred embodiment 40 of a device for protecting the edge weld 200 against a cavitation-induced collapse. This device comprises, essentially, a T-shaped ring 42 and soft material 44. More specifically, the T-shaped ring 42 is disposed indentically as T-shaped ring 42, FIG. 4, is disposed, and the soft material 44 (such as metallic wool, or open cell sponge, or closed cell foam, or the like) is disposed in the horn-like shaped cavity 300 between the legs 42A and 42B of the T-shaped ring 42, thereby filling the cavity 300.

Figure 6:
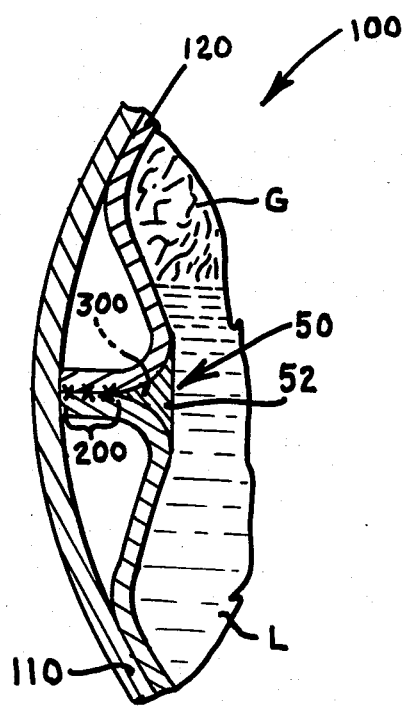
FIG. 6 is a side elevation view, in simplified schematic and pictorial form, partially fragmented and in cross section, of the representative metal bladder tank shown in FIG. 1, in which has been incorporated another additional preferred embodiment of the instant invention.

Now, with reference to FIG. 6, therein is shown an additional preferred embodiment 50 of a device for protecting the edge weld 200 against a cavitation-induced collapse. This device 50 comprises a hard material 52 (such as a brazing compound or the like) which is fixedly positioned in the horn-like shaped cavity 300, thereby filling the cavity 300.

Figure 7:
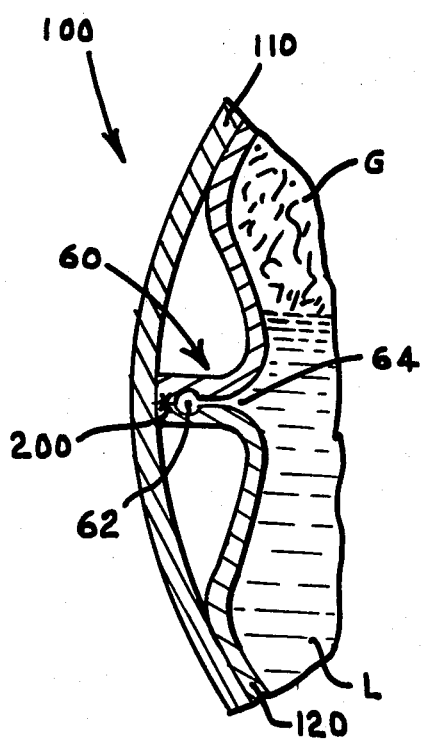
FIG. 7 is a side elevation view, in simplified schematic and pictorial form, partially fragmented and in cross section, of the representative metal bladder tank shown in FIG. 1, in which has been incorporated still another additional preferred embodiment of the instant invention.

With reference to FIG. 7, therein is shown still another additional preferred embodiment 60 of a device for protecting the edge weld 200 against a cavitation-induced collapse. This device 60 comprises a portion of the thin metal bladder 120 having a void 62 at the innermost terminus of the edge weld 200, and a passageway 64 (or orifice, or the like) in communication with the void 62 and with the liquid L in the thin metal bladder 120.

DESCRIPTION OF THE INVENTIVE METHODS

With reference to FIG. 2, therein is shown the result of practicing one of the inventive methods, of the instant invention, of protecting an edge weld 200 of a thin metal bladder 120 against a cavitation-induced collapse, where the bladder 120 is to be partially filled with a pressurized liquid (such as liquid L, FIG. 2) in motion, and where the bladder 120 is disposed within a rigid walled tank (such as 110, FIG. 2), and also where the configuration of the interior surface 120A of the bladder 120 at the edge weld 200 is in the structural form of a cavity (such as 300, FIG. 2) which is horn-like in shape. This method comprises, in essence, the step of interposing a backing 12 made of hard and ductile material 14 (such as the previously mentioned epoxy or brazing compound) between and in contact with the exterior surface 120B of the bladder 120 and the interior surface 110A of the rigid walled tank 110 at a location adjacent to the edge weld 200 of the bladder 120.

The inventive method shown in FIG. 3 of protecting the edge weld 200 of the thin metal bladder 120 against a cavitation-induced collapse comprises, essentially, four steps. They are: placing a T-shaped ring (such as 22, FIG. 3) into the thin metal bladder 120; inserting the normally vertical leg 22A of the T-shaped ring 22 into the horn-like shaped cavity 300; positioning the normally horizontal leg 22B (i.e., the cross leg) of the T-shaped ring 22 across the cavity 300 and in contact with the interior surface 120A of the bladder 120 in a location adjacent to the cavity 300; and, integrating leg 22A of the T-shaped ring 22 with the edge weld 200, preferably by welding.

Another method of the instant invention is shown in FIG. 4, and comprises the three steps, namely: placing the T-shape ring 32 into the thin metal bladder 120; inserting the normally vertical leg 32A of the T-shaped ring 32 into the horn-like shaped cavity 300; and, positioning the normally horizontal leg 32B of the T-shaped ring 32 across the cavity 300 and in contact with the interior surface 120A of the bladder 120 in a location adjacent to the cavity. The essential difference between this method and the method shown in FIG. 3 is that in this method the normally vertical leg 32A is not integrated with the edge weld 200. This method cost less than the method shown in FIG. 3, because the cost of the welding is eliminated. Additionally, the freed (i.e., removably inserted) T-shape ring 32, through its motion relative to the interior surface 120A of the bladder 120, becomes and advantageously functions as a high vibration damper.

With reference to FIG. 5, there is shown the result of practicing the steps of still another method of the instant invention. This method comprises, in essence, four steps, three of the steps being the same as those set forth hereinabove with regard to the inventive method shown in FIG. 4. The fourth, and additional, step comprises disposing a soft material 44 (such as the previously metered metallic wood, or the open cell sponge, on the closed cell foam) in the horn-like shaped cavity 300 between the legs 42A and 42B of the T-shaped ring 42.

Still another method of the instant invention is shown in FIG. 6, and comprises the steps of fixedly positioning a hard material 52 (such as the brazing compound previously mentioned) in the horn-like shaped cavity 300.

With reference to FIG. 7, therein is shown the result of practicing the steps of yet another method of the instant invention. This method comprises, essentially, two steps. They are: forming a void or other cavity (such as 62, FIG. 7) in a portion of the bladder 120 at the innermost terminus of the edge weld 200; and, forming a passageway of orifice (such as 64, FIG. 7), in the same portion of the bladder 120 in which the void 62 is formed, such that the passageway 64 interconnects the void 62 with the liquid L, FIG. 7, when the bladder 120 is, in fact, thereafter filled with the liguid L.

MANNER AND USE OF THE PREFERRED EMBODIMENTS

The manner of use, and of operation, of the preferred embodiments 10, 20, 30, 40, 50 and 60 of the device (i.e., apparatus) portion of the instant invention can be easily ascertained by any person of ordinary skill in the art from the foregoing description, coupled with reference to the contents of the Figures of the drawing.

For those not of the art, the manner of use and operaton of the device portion 10, 20, 30, 40, 50 and 60 of the instant invention can be learned by correlating the essential and fundamental steps of the described method portions of the invention with contents of the Figures of the drawing and with the description of the preferred embodiments (i.e., 10, FIG. 2; 20, FIG. 3; 30, FIG. 4; 40, FIG. 5; 50, FIG. 6; and 60, FIG. 7) of the instant invention.

CONCLUSION

It is abundantly clear from all of the foregoing, and from the contents of the Figures of the drawing, that the stated objects of the instant invention, as well as other objects related thereto, have been achieved.

It is to be noted that, although there have been described and shown the fundamental and unique features of the device (i.e., apparatus) portion of the instant invention as applied to six (6) preferred embodiments, nevertheless various other embodiments, variations, adaptations, substitutions, additions, omissions, and the like may occur to and can be made by those of ordinary skill in the art.

It is also to be noted that, because of the teachings herein, it may occur to others of ordinary skill in the art that, in appropriate circumstances, the number of the basic and fundamental steps of the inventive method portion of the instant invention can be increased, decreased or otherwise varied, and/or that their sequence can be changed. In this regard, it is to be noted and remembered that, in spite of any variations in the number or sequence of the steps of the particular method set forth herein, only the same results as already described herein will be obtained.

What is claimed is:

1. A method of protecting an edge weld of a thin metal bladder against a cavitation-induced collapse, wherein said bladder is to be partially filled with a pressurized liquid in motion, and wherein said bladder is disposed within a rigid walled tank, and also wherein the configuration of the interior surface of said bladder at said edge weld is in the structural form of a cavity which is horn-like in shape, said method comprising the step of interposing a backing made of hard and ductile material between and in contact with the exterior surface of said bladder and the interior surface of said tank at a location adjacent to said edge weld of said bladder.

2. A method, as set forth in claim 1, wherein said hard and ductile material is an epoxy.

3. A method, as set forth in claim 1, wherein said hard and ductile meterial is a brazing compound.

4. A method of protecting an edge weld of a thin metal bladder against a cavitation-induced collapse, wherein said bl dder is to be partially filled with a pressurized liquid in motion, and wherein said bladder is disposed within a rigid walled tank, and also wherein the configuration of the interior surface of said bladder at said edge weld is in the structural form of a cavity which is horn-like in shape, said method comprising the step of interposing a backing made of hard and ductile material between and in contact with the exterior surface of said bladder and the interior surface of said tank at a location adjacent to said edge weld of said bladder, said method comprising the steps of:

a. placing a T-shaped ring into said thin metal bladder;

b. inserting the normally vertical leg of said T-shaped ring into said horn-like cavity; and c. positioning the normally horizontal leg of said T-shaped ring across said cavity and in contact with said interior surface of said bladder in a location adjacent to said cavity.

5. A method, as set forth in claim 4, wherein said method further comprises the additional step of welding said normally vertical leg of said T-shaped ring, which is inserted into said horn-like cavity, to said edge weld, whereby said leg is integrated with said edge weld.

6. A method, as set forth in claim 4, wherein said method further comprises the additional step of disposing a soft material in said horn-like cavity between said legs of said T-shaped ring.

7. A method, as set forth in claim 6, wherein said soft material, disposed in said horn-like cavity between said legs of said T-shaped ring, is metallic wool.

8. A method, as set forth in claim 6, wherein said soft material, disposed in said horn-like cavity between said legs of said T-shaped ring, is open cell sponge.

9. A method, as set forth in claim 6, wherein said soft material, disposed in said horn-like cavity between said legs of said T-shaped ring, is closed cell foam.

10. A method of protecting an edge weld of a thin metal bladder against a cavitation-induced collapse, wherein said bladder is to be partially filled with a pressurized liquid in motion, and wherein said bladder is disposed within a rigid walled tank, and also wherein the configuration of the interior surface of said bladder at said edge weld is in the structural form of a cavity which is horn-like in shape, said method comprising the step of fixedly positioning a hard material in said cavity, thereby filling said horn-like cavity with said hard material.

11. A method, as set forth in claim 10, wherein said hard material, fixedly positioned in and filling said horn-like cavity, is a brazing compound.

12. A method of protecting an edge weld of a thin metal bladder against a cavitation-induced collapse, wherein said bladder is to be partially filled with a pressurized liquid in motion, and wherein said bladder is disposed within a rigid walled tank, and also wherein the configuration of the interior surface of said bladder at said edge weld is in the structural form of a cavity which is horn-like in shape, said method comprising the steps of:

a. forming a void in a portion of said bladder at the innermost terminus of said edge well; and b. forming a passageway, in said portion of said bladder, such that said passageway interconnects said void with said liquid, when said bladder is partially filled with said liquid.

* * * * *